United States Patent
Scaringe

(10) Patent No.: US 7,740,025 B2
(45) Date of Patent: Jun. 22, 2010

(54) METHOD AND APPARATUS FOR PREVENTING DRAIN LINE CLOGGING OVER AN EXTENDED TIME USING LIQUID OR SOLID BIOCIDES

(75) Inventor: Robert P. Scaringe, Rockledge, FL (US)

(73) Assignee: Mainstream Engineering Corp., Rockledge, FL (US)

( * ) Notice: Subject to any disclaimer, the term of this patent is extended or adjusted under 35 U.S.C. 154(b) by 1240 days.

(21) Appl. No.: 11/288,136

(22) Filed: Nov. 29, 2005

(65) Prior Publication Data

US 2007/0119503 A1    May 31, 2007

(51) Int. Cl.
   *C02F 1/50*     (2006.01)
   *F24F 13/22*    (2006.01)

(52) U.S. Cl. ............... 137/247.39; 137/268; 210/198.1; 62/303

(58) Field of Classification Search ............ 137/247.35, 137/247.39, 247.51, 268; 4/222; 210/198.1; 422/255, 256, 261; 62/303
See application file for complete search history.

(56) References Cited

U.S. PATENT DOCUMENTS

| | | | |
|---|---|---|---|
| 3,595,786 A * | 7/1971 | Horvath et al. ........... 210/198.1 |
| 5,286,377 A * | 2/1994 | Galvan ..................... 210/198.1 |
| 5,402,813 A | 4/1995 | Keen |
| 5,976,364 A * | 11/1999 | Williams ..................... 137/268 |
| 6,303,039 B1 | 10/2001 | Back et al. |
| 6,584,995 B2 * | 7/2003 | Kimbrough et al. ......... 137/240 |
| 6,651,690 B1 * | 11/2003 | Coogle ....................... 137/268 |
| 6,895,771 B1 * | 5/2005 | Cantolino .................... 62/303 |

* cited by examiner

*Primary Examiner*—John Rivell
(74) *Attorney, Agent, or Firm*—Crowell & Moring LLP

(57) ABSTRACT

An improved method and apparatus to prevent clogging of condensate drain lines with a biocide delivery system that prevents the growth of bioorganic growth in the liquid trap using time release biocide tablets or liquid biocide. When using solid biocide tablets erosion and dissolution of the tables is reduced. When using liquid biocides, combination of initial release followed by gradual release of residual liquid biocide in the drain water is attainable. Drain line are promoted from clogging while being installed anywhere on the drain line upstream of the liquid trap. The apparatus can also be incorporated with a liquid trap, allowing placement anywhere in the drain line.

11 Claims, 7 Drawing Sheets

METHOD AND APPARATUS FOR PREVENTING DRAIN LINE CLOGGING OVER AN EXTENDED TIME USING LIQUID OR SOLID BIOCIDES

BACKGROUND AND SUMMARY OF THE INVENTION

Air-conditioners, dehumidifiers and other climate control systems circulate air over a cooler surface. The evaporator cooling coil of an air conditioner, for example, condenses water from the humid air and this condensate generally drains and collects in a pan which is connected to the outdoors by a drain line. The temperature, humidity, and general environment of the condensate pan is favorable for the growth of microbes. These growths can clog the drain lines and result in flooding of the adjacent area (since the condensate pan has a free surface open to the air, which can overflow).

During winter months, humidifiers are sometimes used to humidify dry air by passing dry air across a moist surface. Systems such as pan humidifiers, power wetted-element humidifier, atomizing humidifiers, ultrasonic humidifiers, and rigid media humidifiers are common. A humidifier by nature requires a water source which is evaporated into the dry air. To avoid the build-up of non-volatile solids (such as calcium and other minerals) as the water is evaporated from the humidifier, excess water is supplied to the humidifier, requiring a humidifier drain line to transport the remaining excess water and non-volatile solids that could not otherwise evaporate. The water draining from these systems can develop microbial colonies which can clog the drain line and thereby flood the area adjacent to the humidifier (since the humidifier also has a free surface open to the air, which can overflow).

Treating the condensate water contained in the condensate pan has the additional advantage of removing microbes entrained by the circulating air of a climate control system. One way to eliminate these microbes is to open the system and place a biocide tablet directly in the condensate drain pan or humidifier. This is accomplished by removing access panels and insulation to gain access to the condensate pan (in the case of an AC systems) or the humidifier reservoir. However, it is usually not a trivial matter to open and close a climate control system such as an air-conditioner air handling unit or forced-air furnace. While the treatment of the microbial growths directly in the condensate pan of an air conditioner would be ideal, a simpler location would be to treat the drain line as the condensate water exits the air handler or humidifier. This is an easer location to access. The present invention involves an improved device for treating the water as it exits the air handler or humidifier, without the need to open any access panels or disassemble any systems.

The presents invention treats the water contained in the condensate pan by the use of a dispenser located immediately downstream of the condensate drain, i.e., the microbial growths are treated directly in the condensate pan of an air conditioner or humidifier from an adjacent downstream location and without opening up the system or removing access panels. In one embodiment of the present invention, the water trapped in the dispenser communicates with the water retained in the condensate pan (the trapped and retained water are at the same elevation), thereby allowing diffusion of the biocide chemicals from the dispenser into the condensate pan of the A/C unit (or into the humidifier), without requiring access to the condensate pan to introduce the biocide directly into the pan.

The treatment of the microbe laden water can be accomplished using an automatic time-released or long duration method. For example. one tablet or packet could reduce bacteria, fungi, algae, and mold in a water reservoir for an entire summer (e.g., about 3 months or longer). Metals such as silver (Ag), nickel (Ni), zinc (Zn), and copper (Cu) are known in the art as effective biocides. For example, Ag is effective against virus and bacteria. In particular, a concentration of about 0.02 ppm (or 20 ppb) in water is effective against *Legionella pneumophilia*. Cu is also an effective algaecide and in some cases a bactericide. Other metals can also be effective against different microbes to differing degrees. This time release technology is more completely described by U.S. Pat. No. 6,303,039B1 to Back, et. al. Metals such as these used as a biocide are typically provided in water-soluble form. Hence, these materials are generally added to water systems as a water soluble salt. In order to extend the biocidal efficacy of these highly soluble salts over an extended period of time, the compounds must be metered into the water mechanically or added manually on a schedule. An external dispenser would allow the equipment owner, instead of the service technician, the ability to add the biocide, since no knowledge of the way (or the tools and skills necessary) to remove the access panels to gain access to the condensate pan would be required. Prior to the present invention, these external in-line chlorinators had no capability to treat the water upstream in the condensate pan or humidifier. Such an in-line chlorinator is disclosed in U.S. Pat. No. 5,402,813 to Keen and sold under the "AL-G-Gator" name. U.S. Pat. No. 5,402,813 also discusses the use of additional "water-leachable algicide" that "preferably includes an ingredient which gradually releases chlorine to a flowing stream of water." Two time release tablets; are specifically mentioned namely PACE®, a registered trademark of Olin Corporation and 2,000 Flushes®, a registered trademark of Block Drug Company. We have found that the time-release method disclosed by in U.S. Pat. No. 6,303,039B1 is preferred to the time-release products disclosed in U.S. Pat. No. 5,402,813.

The cost of manufacturing a time-release biocide is significantly more expensive that simply using common liquid chlorine beach used everyday by homeowners. One object of the present invention is to develop a dispenser which can be located in a convenient location for equipment owner access, so that a professional technician is not required for using the dispenser, and to configure the dispenser with a wide-mouth to simplify the pouring of common household bleach into the dispenser.

Another object of the present invention is to develop a dispenser which will allow both the immediate and gradual release of a liquid biocide, including common household liquid bleach.

I have discovered that while there is biological growth in the condensate water from an air-conditioning system (or humidifier drain line), and therefore on any surface in contact with this water, the only instances where this growth can result in flooding of the building, is when the growth blocks the flow of water in the drain line. The flow of water in these drain lines is due to the effects of gravity only, therefore there is only the elevation head of the water which supplies the pressure needed to establish a flow rate or dislodge a clog.

I have also discovered that, if the drain line is properly installed, there is one specific location in the drain line where the clog will occur, namely the condensate liquid trap. A liquid trap is a U-section of plumbing that is installed in a (gravity-induced flow) plumbing line to seal off the plumbing when there is no water flow (a low point in the plumbing located below both the inlet and outlet). For a gravity-driven water flow, when the flow stops, water is trapped in the U-section of a liquid trap, since both the inlet and outlet are located at a higher elevation. This trapped water seals the pipe. In a sewage line, the liquid trap acts as a vapor barrier to kee sewers gases from entering the house, whereas in an HVAC condensate line (or humidifier drain line), the liquid trap serves as a inset barrier to prevent insects, bugs and the like from traveling from the outside of the house through the drain line and into the HVAC system of the building. Since this liquid trap always contains stagnant water, it represents the location were a plumbing clog due to biological growth will occur. Column 3 of above-mentioned U.S. Pat. No. 5,402,813, he states that the "in-line algicide dispenser is inserted in the condensation line or drain as close to the air-conditioner, icemaker, or other appliance as possible. Stated in slightly different terms, the water-leachable algicide is disposed in the flowing stream of condensate as far upstream as possible." I have found that it is unnecessary to locate the dispenser as far as possible upstream; rather it only needs to be upstream of the liquid trap. Furthermore, it is far better to install the in-line dispenser in the most convenient location for access by the untrained equipment owner or homeowner. That is, the dispenser should be located where it is convenient for the equipment owner to easily access the dispenser and add household liquid bleach or time release tablets, as long as it is located upstream of the condensate trap. Since the condensate trap is typically located outdoors at the very end of the condensate line, the liquid dispenser can also be located outdoors, which may prove to be convenient for adding household liquid bleach or time-release tablets.

Still another object of the present invention is to improve the dispenser shown in U.S. Pat. No. 5,402,813 to Keen by using a wide mouth dispenser to simplify the pouring of ordinary household liquid bleach into the dispenser.

Another object of the present invention is to improve the known dispenser by using a contained volume which provides erosion protection for the solid biocide, retains the solid biocide in the dispenser (to avoid the solid biocide from clogging the outlet), and in the case of a liquid biocide provides for a gradual release (by dilution with condensate water) of some liquid biocide trapped in the contained volume.

I have found that a time-release or the otherwise "gradual release of chlorine" as discussed by at Column 2, lines 51 et seq. of U.S. Pat. No. 5,402,813 is not necessary to prevent drain line clogging. In addition to the significant cost differential between time-release tablets and ordinary household bleach, I have also found that introducing household chlorine bleach periodically is sufficient to prevent line clogging and that it is not necessary for a time-released introduction of chlorine into the condensate drain line. As stated above however, I have developed an effective way to provide some level of time-release action.

I have recognized that the biological growth that occurs in the condensate drain line's liquid trap, is only a problem once it has become sufficient to actually clog the line. Therefore, rather than continually killing any growth as it occurs, it is only necessary to kill any growth before it completely clogs the condensate line. While the time to actually clog a drain line is dependent on the nutrients in the water, the water temperature, and the microorganisms present, the time for such grown is on the order of 6 to 12 months, therefore a periodic introduction of liquid bleach (for example, once at the beginning of the cooling season in the northern climates) and quarterly in the southern climates is more than sufficient.

The avoidance of flooding due to biological growth which clogs the condensate drain line is not to be confused with the effect of biological growth on the evaporator coils, condensate drain pain or humidifier (which are exposed to conditioned air). Growth on these surfaces should be minimized by the use of biocide treatment tablets, as disclosed by above-mentioned U.S. Pat. No. 6,303,039B1, to avoid the entrainment of such biological contaminates into the air being breathed by inhabitants of the building, especially if such occupants have allergies to mold or fungi. However, a dispenser in the condensate or humidifier drain line, which is downstream of these surfaces will typically have no effect on biological growth upstream. However, the present invention also contemplates an embodiment where the biocide in the dispenser, located downstream and adjacent to the condensate drain, will allow biocide to diffuse into the condensate pan or humidifier.

Therefore, to summarize, the present invention provides an improved dispenser for the simple periodic treatment of clogged condensate lines by untrained equipment owners. Moreover, the present invention also provides a device which, when utilized and correctly located, will also allow the introduction or liquid or solid biocides into the condensate pan of AC units or into hot-air furnace humidifiers where the biocides improve indoor air quality in addition to killing microorganisms that might clog drain lines. Prior to the present invention, the introduction of biocides into drain pans and furnace humidifiers had required the services of a skilled HVAC/R technician to introduce the biocide multiple times per year.

BRIEF DESCRIPTION OF THE DRAWINGS

Other objects, advantages and novel features of the present invention will become apparent from the following detailed description when considered in conjunction with the accompanying drawings herein.

DETAILED DESCRIPTION OF THE INVENTION

According to a presently preferred embodiment of the present invention, a dispenser which allows time release tables or ordinary household. chlorine to be introduced into the condensate drain line or humidifier drain line upstream of the liquid trap.

Figure 1A:
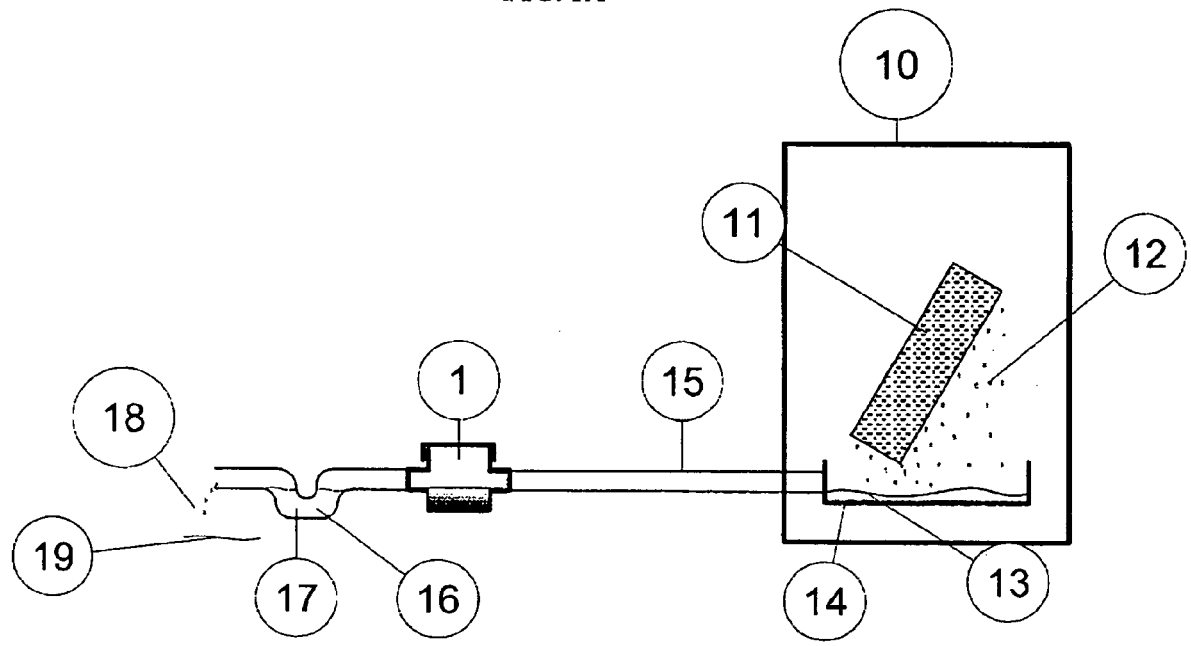
FIG. 1A is a schematic cross-sectional view of an improved in-line dispenser for immediately introducing liquid biocide including ordinary household liquid chlorine bleach, or for storing a biocide tablet which will over time introduce biocide ingredient, into a condensate or humidifier drain line assembly upstream of the drain line liquid trap.

Referring to FIG. 1A, the in-line dispenser 1 is located downstream of the air handler 10 in an A/C unit. An evaporator unit 11 is located inside the air handler 10. Condensate 12 drips by gravity from the evaporator unit 11 and collects as pooled condensate 13 on the condensate pan 14 located below the evaporator unit 11. A drain line 15 extends from the condensate pan 14 in which line the in-line dispenser 1 is installed. A liquid trap 16 is located downstream of the dispenser to trap liquid 17 with condensate 18 draining from the exit of the line 15 onto the ground 19 outside a building or the like.

Figure 1B:
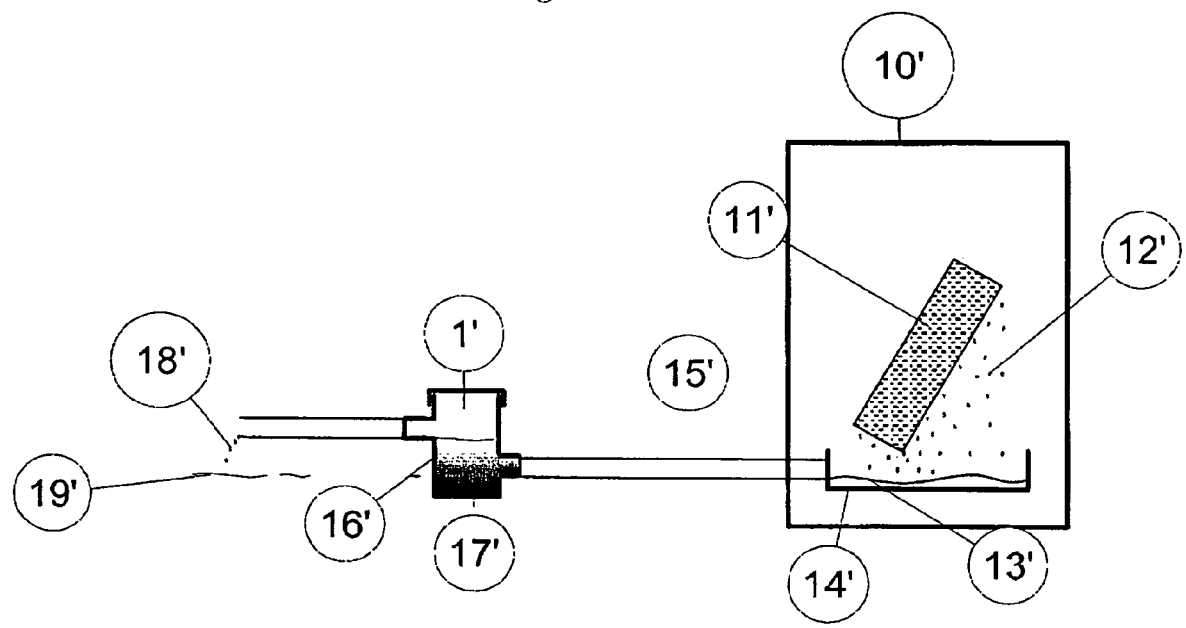
FIG. 1B is a schematic view of a device similar to the device shown in FIG. 1A, but which also incorporates a liquid trap within the device

The embodiment of FIG. 1B designates the same parts as those used in the embodiment of FIG. 1A with the same reference numerals but primed. Therefore, further description thereof is unnecessary. Instead of using a liquid trap 16 as in the embodiment of FIG. 1A, the in-line dispenser 1' in the embodiment of FIG. 1B is configured with a liquid trap section 16'.

Figure 2A:
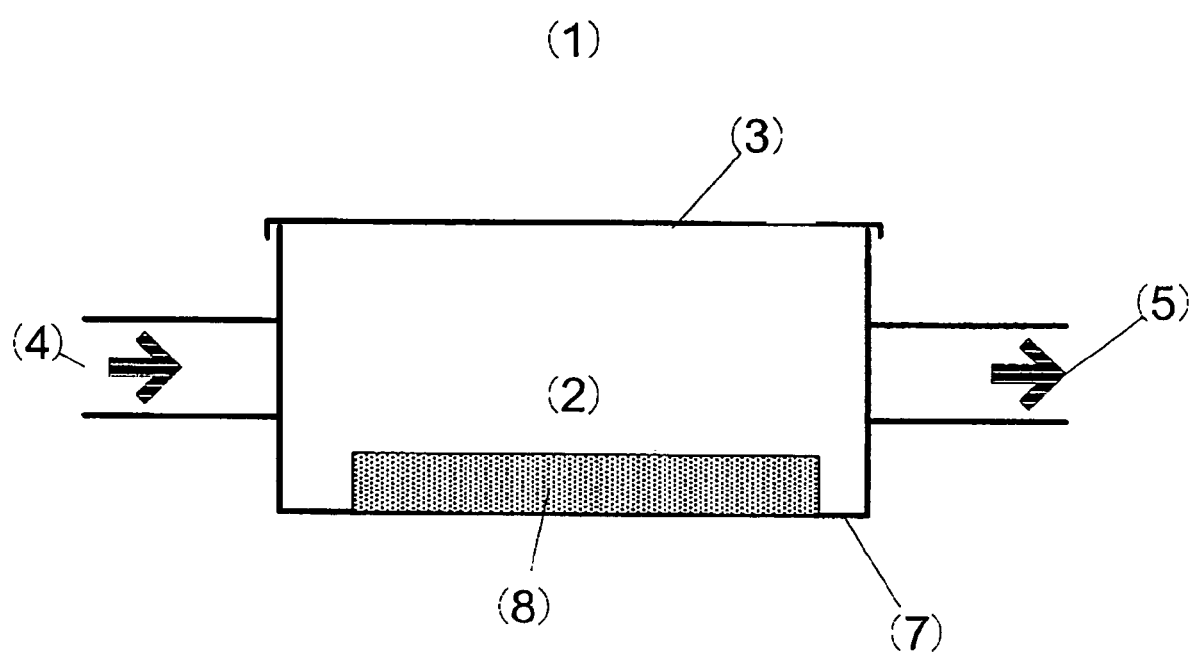
FIG. 2A is a schematic cross-sectional view of the improved in-line dispenser with a solid biocide tablet installed therein.

Referring now to FIG. 2A, the dispenser (1) includes a center reservoir section (2) with large removable cover (3) with an inlet (4) and outlet (5) located on each side of the reservoir (2). The reservoir 2 has a larger cross-sectional flow area to increase. The flow area and thereby reduce the velocity of the condensate flow through the reservoir 2. A reduced liquid velocity will reduce the flow-induced dissolution of the solid biocide tablet (8) located on the bottom of the reservoir. The inlet 4 and outlet 5 are positioned so that, when the device is mounted horizontally, condensate water flows into the dispenser, through the reservoir section and exits from the outlet for subsequent flowing into a downstream liquid trap. The inlet and outlet are also positioned so that a contained volume (7) is located below the inlet and outlet to: A) retain the biocide tablet in the reservoir and keep it from flowing down the drain line and potentially obstructing the flow and B) position the slow-dissolving biocide tablet out of the direct flow path of the water passing through the dispenser, so as to minimize erosion and the accompanying accelerated dissolution of the tablet.

Figure 2B:
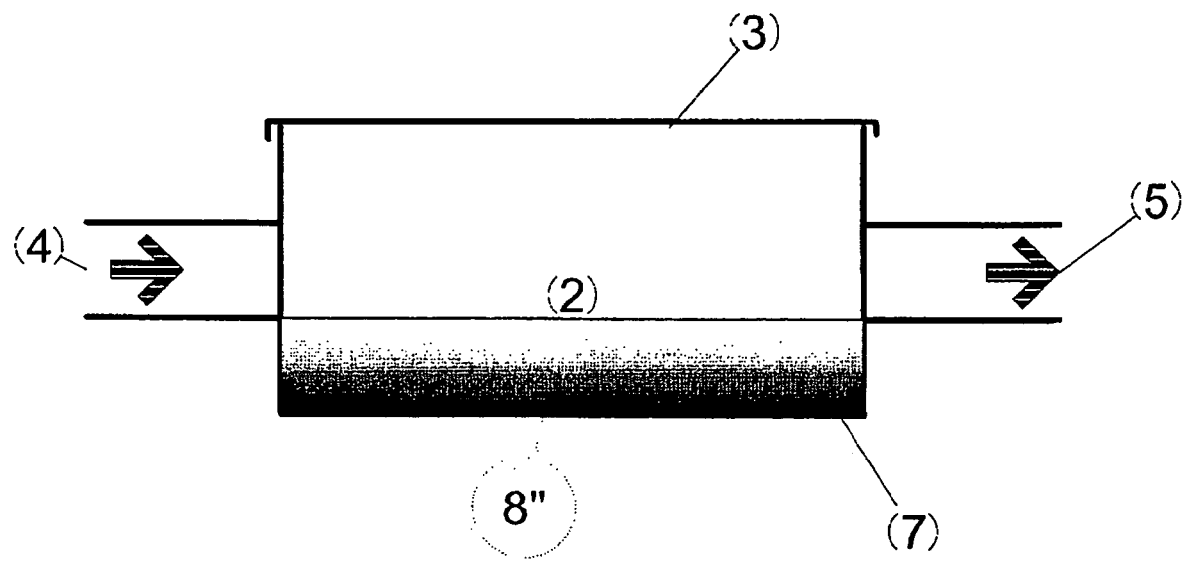
FIG. 2B is a view of the improved in-line dispenser of FIG. 2A but being used with liquid biocide where there is a gradual release of some residual liquid biocide by dilution with incoming condensate.

As depicted in FIG. 2B, when common household bleach or other liquid biocides are added, the contained volume (7), serves to trap some of the liquid biocide added so that it will mix with incoming drain water to produce a time-release dispersion of the resulting mixture. It is contemplated that the volume of this contained volume (7) can be adjusted, to adjust the rate of dispersion of this residual liquid biocide as a function of flow rate.

Figure 3:
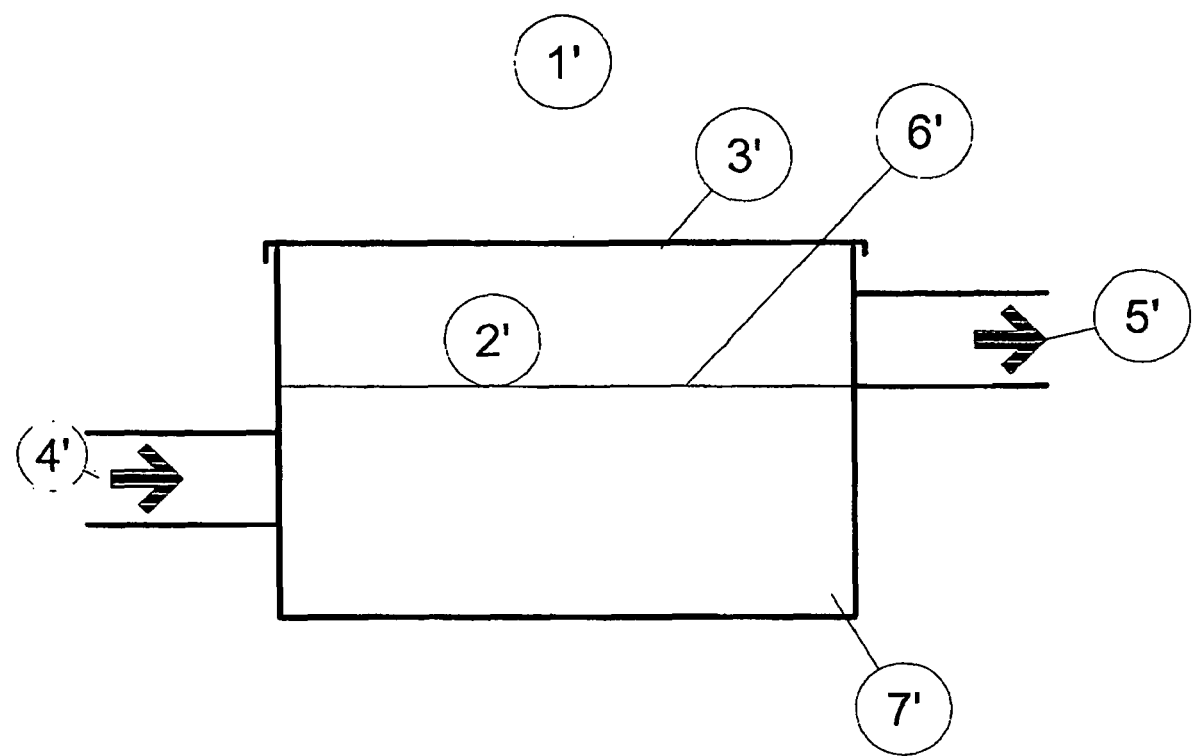
FIG. 3 is a schematic cross-sectional view of the improved in-line dispenser similar to FIGS. 2A and 2B but with the added feature of incorporating a liquid trap directly into the dispenser.

Alternatively, the dispenser 1 can be configured as shown in FIG. 3, so that the reservoir acts as the liquid trap. Whereby the base of the outlet (5') is located above the top of the inlet (4'), so that water remains in the reservoir, forming a liquid surface (6') and seals off the inlet (4'). This configuration differs from a typical liquid trap since only the outlet is above the trapped liquid level. A further advantage of this configuration is that if this configuration is attached directly to the outlet of the condensate pan (as shown in the embodiments in FIGS. 4A and 4B), the drain water in the reservoir 2' will be able to communicate directly with the drain water in the condensate drain pan because both are below the outlet of the dispenser 1. Therefore, any chemicals introduced into the reservoir 2' will diffuse into the condensate pan as well, thereby allowing the water in the condensate pan to be treated without requiring the time consuming and more technically difficult step of gaining access to the condensate pan and, therefore, without the requirement of a skilled technician to introduce the biocide into the pan directly. The liquid level in the condensate drain pan is established by the height of the base of the outlet of the dispenser.

Figure 4A:
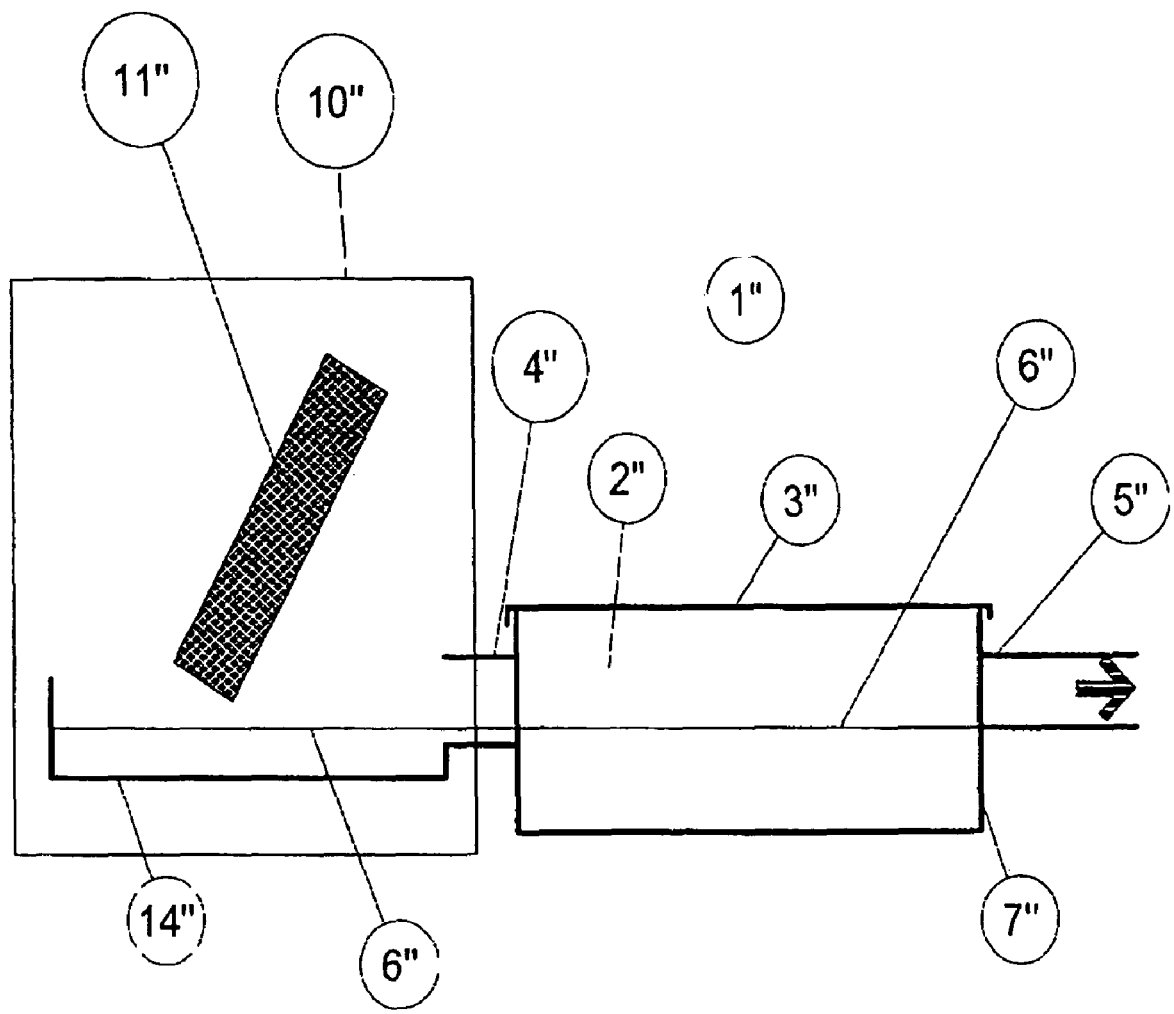
FIG. 4A is a schematic cross-sectional view of one embodiment of the improved in-line dispenser with integral liquid trap, where the outlet line is only slightly above the inlet, so as to allow the biocide to travel from the dispenser (upstream) into the drain pan of an A/C unit without significantly increasing the liquid level in the condensate drain pan.
Figure 4B:
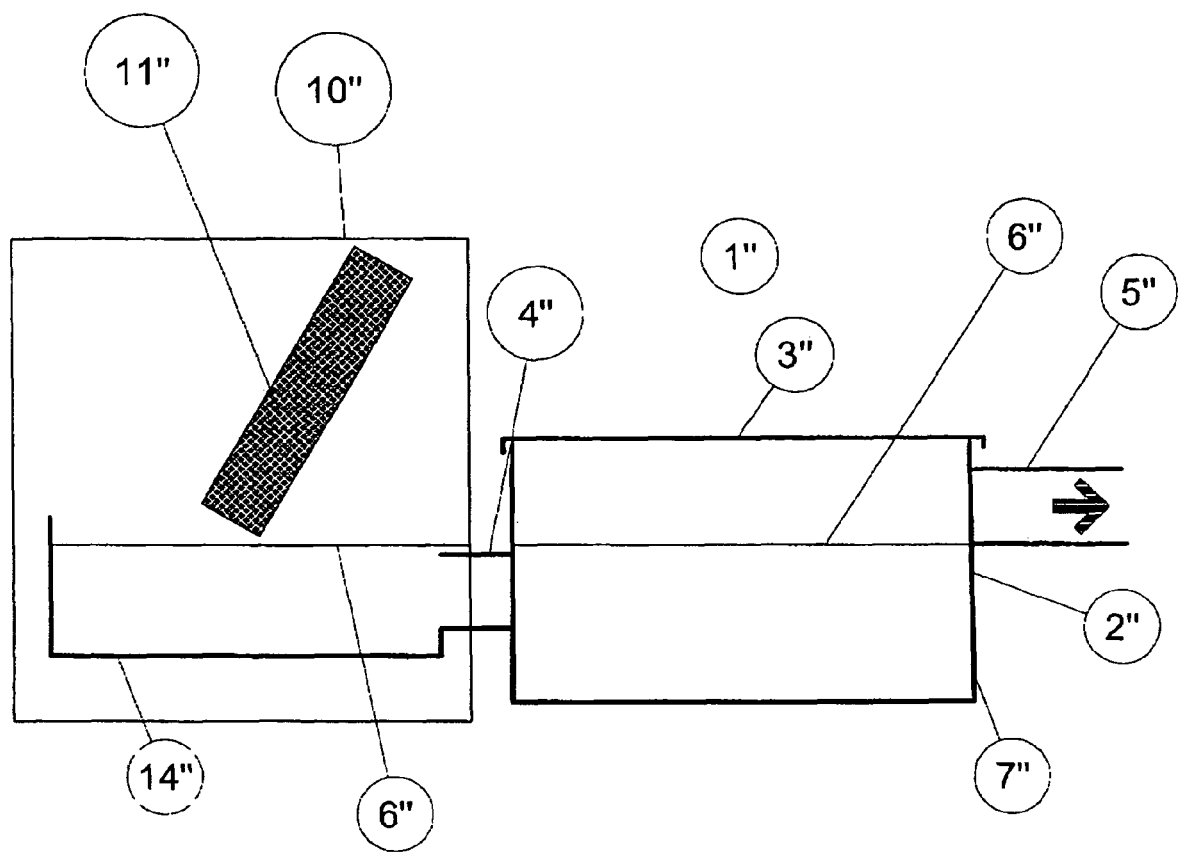
FIG. 4B is a view of an alternative embodiment of the improved in-line dispenser shown in FIG. 4A with integral liquid trap, where the outlet line is completely above the inlet, so as to allow the biocide to travel from the dispenser (upstream) into the drain pan of an A/C unit.

For the in-line device to communicate with the drain water contained in the condensate pan or humidified, I have found that the base of the outlet 5" should be located anywhere from 0.01*D or more above the base of the inlet 4", where D is the diameter of the inlet (FIG. 4A). However, if the dispenser is to also serve as a liquid trap, then the base of the outlet must also be above the top of the inlet, that is the base of the outlet must be greater than 1.0*D above the base of the inlet (FIG. 4B). The currently preferred embodiment when the liquid trap feature is not desired is to locate the base of the outlet 0.5*D above the base of the inlet, which for a 0.5 inch inlet, means the water level in the condensate pan will be 0.25 inch. Alternatively, when a liquid trap feature is also desired, then the preferred embodiment is to locate the base of the outlet 1.1*D above the base of the inlet, which for a 0.5 inch inlet, means the water level in the condensate pan will be 0.55 inch.

It is also currently preferred to locate the inline dispenser of FIGS. 2A and 2B in a convenient location anywhere upstream of the liquid trap. In the embodiment shown in FIG. 3, where the dispenser 1' includes an integral liquid trap, the dispenser can be located at any convenient location anywhere in the drain line plumbing. In the case of the third and fourth embodiments (shown in FIG. 4A and FIG. 4B, respectively), where the liquid trap causes the condensate water in the disperser's reservoir and the condensate drain pan to be at the same level and in chemical communication, via diffusion, then the device should be located as close as possible to the condensate drain pan outlet. In the FIG. 4A configuration an additional convential liquid trap is also necessary to seal the plumbing line to prevent insects and the like, from entering the building through this line. In the FIG. 4B configuration no additional liquid trap is required to seal the plumbing line to prevent insects and the like, from entering the building through this line.

EXAMPLE 1

A formulation of 70% EDTA, 23% SA, 6.5% CuO, and 0.5% AgO was formed into 6 g tablets. The tablets were placed in the biocide dispenser of FIG. 2A with a flow of 75 milliliters per minute to simulate the condensate flow rate from a 3 ton residential air conditioner evaporator coil. The tablet had a life of about 4 months. The average concentrations of Ag and Cu in the water were 7 and 72 ppb, respectively.

EXAMPLE 2

A formulation of 70% EDTA, 23% SA, 6.5% CuO, and 0.5% AgO was formed into 6 g tablets. The tablets were placed in the biocide dispenser of FIG. 2A and glued into the condensate line (just upstream of the liquid trap) of a 3 ton residential air conditioner evaporator coil. The tablet had a life of about 4 months.

EXAMPLE 3

The biocide dispenser of FIG. 2B was glued into the condensate line (just upstream of the liquid trap) of a 3 ton residential air conditioner evaporator coil. Eight ounces of household bleach was poured into the dispenser, some of the bleach was initially trapped in the storage volume (2) at the base of the dispenser, while the majority of the bleach immediately traveled through the remaining length of condensate drain line. The bleach that was initially trapped in the storage volume (7) was continually diluted and dispersed down the condensate drain line with the flow of condensate water.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for eliminating clogging of a gravity-driven condensate drain line or humidifier overflow line and for treating a condensate drain pan or humidifier reservoir by preventing growth of biological agents, mold, and fungus, comprising a housing configured to accommodate a biocide wherein an outlet base located above an inlet base of the housing is continuously communicating with the condensate drain pan or humidifier reservoir so that a liquid level in the housing and the condensate drain pan or humidifier reservoir are at the same elevation and therefore form one continuous water body to allow dissolved biocide agents or other chemicals introduced into the housing to be diffusible into the condensate drain pan or humidifier reservoir.

2. An apparatus according to claim 1, wherein the housing has a relatively wide mouth sealable opening to facilitate pouring of the biocides into the housing without spillage.

3. An apparatus according to claim 1, wherein the housing is configured with a reservoir to accommodate a volume of liquid or solid biocides and has a recessed portion of the reservoir to retain a portion of a liquid biocide or to retain a solid biocide out of a direct condensate flow stream.

4. An apparatus according to claim 1, wherein the housing is configured to provide slower dissolution of a solid biocide agent, and utilizes a recessed volume to keep the solid biocide agent out of a direct condensate flow stream.

5. An apparatus according to claim 1, wherein the housing is configured to expand flow area so as to reduce condensate flow velocity and thereby reduce flow-induced dissolution of the biocide agent comprised of a solid biocide tablet.

6. An apparatus according to claim 1, wherein a reservoir in the housing is operative as a liquid trap with outlet base elevated above a top of an inlet, thereby to cause the gravity-driven drain water to remain in the reservoir so as to form a liquid surface and seal off the inlet.

7. An apparatus according to claim 6, wherein the housing is configured to accommodate liquid biocide fluids and allow for immediate dispersion of a predetermined portion of the liquid biocide fluids while also providing for gradual release of a remainder of the liquid biocide retained in the liquid trap.

8. An apparatus according to claim 1, wherein the housing is locatable adjacent an outlet fitting of the condensate drain pan.

9. An apparatus according to claim 1, wherein the outlet base is located at least 0.01*D higher than the inlet base, wherein D is the inlet diameter.

10. An apparatus according to claim 1, wherein the outlet base is located at least 1.01*D higher than the inlet base to allow water in the reservoir to also seal-off the inlet, wherein D is the inlet diameter.

11. A method of using an apparatus as defined in claim 1, comprising:

gravity feeding water in a condensate drain line or humidifier overflow line through a housing which serves as both a liquid trap and a reservoir for liquid or solid biocides.

* * * * *